United States Patent [19]
Zettler et al.

[11] 3,824,890
[45] July 23, 1974

[54] CHIP GUARD FOR MACHINE TOOLS

[76] Inventors: William D. Zettler; Earl E. Johnson, both of c/o Giddings & Lewis, Inc., Fond Du Lac, Wis. 54935

[22] Filed: June 15, 1972

[21] Appl. No.: 263,322

Related U.S. Application Data

[63] Continuation-in-part of Ser. No. 108,917, Jan. 22, 1971, abandoned.

[52] U.S. Cl. .............. 90/11 R, 51/268, 144/251 R, 408/241 G, 408/710
[51] Int. Cl. ..... B23b 47/00, B23c 9/00, B23q 11/08
[58] Field of Search .......... 51/268, 269; 144/251 R, 144/251 A; 90/11 A, 11 R; 408/710, 241 G

[56] References Cited
UNITED STATES PATENTS
3,366,012   1/1968   Richter .............................. 90/11 R FOREIGN PATENTS OR APPLICATIONS
363,604   9/1962   Switzerland ..................... 408/241 G

*Primary Examiner*—Francis S. Husar
*Attorney, Agent, or Firm*—Wolfe, Hubbard, Leydig, Voit & Osann

[57] ABSTRACT

An automatically operated chip guard arrangement is disclosed in the environment of a multi-purpose horizontal spindle machine tool and is adapted to be mounted on the headstock surrounding the top and sides of the tool operator. The chip guard automatically extends into contact with a workpiece at the operating station and readjusts itself to changes in relative distance between the workpiece and the headstock.

15 Claims, 20 Drawing Figures

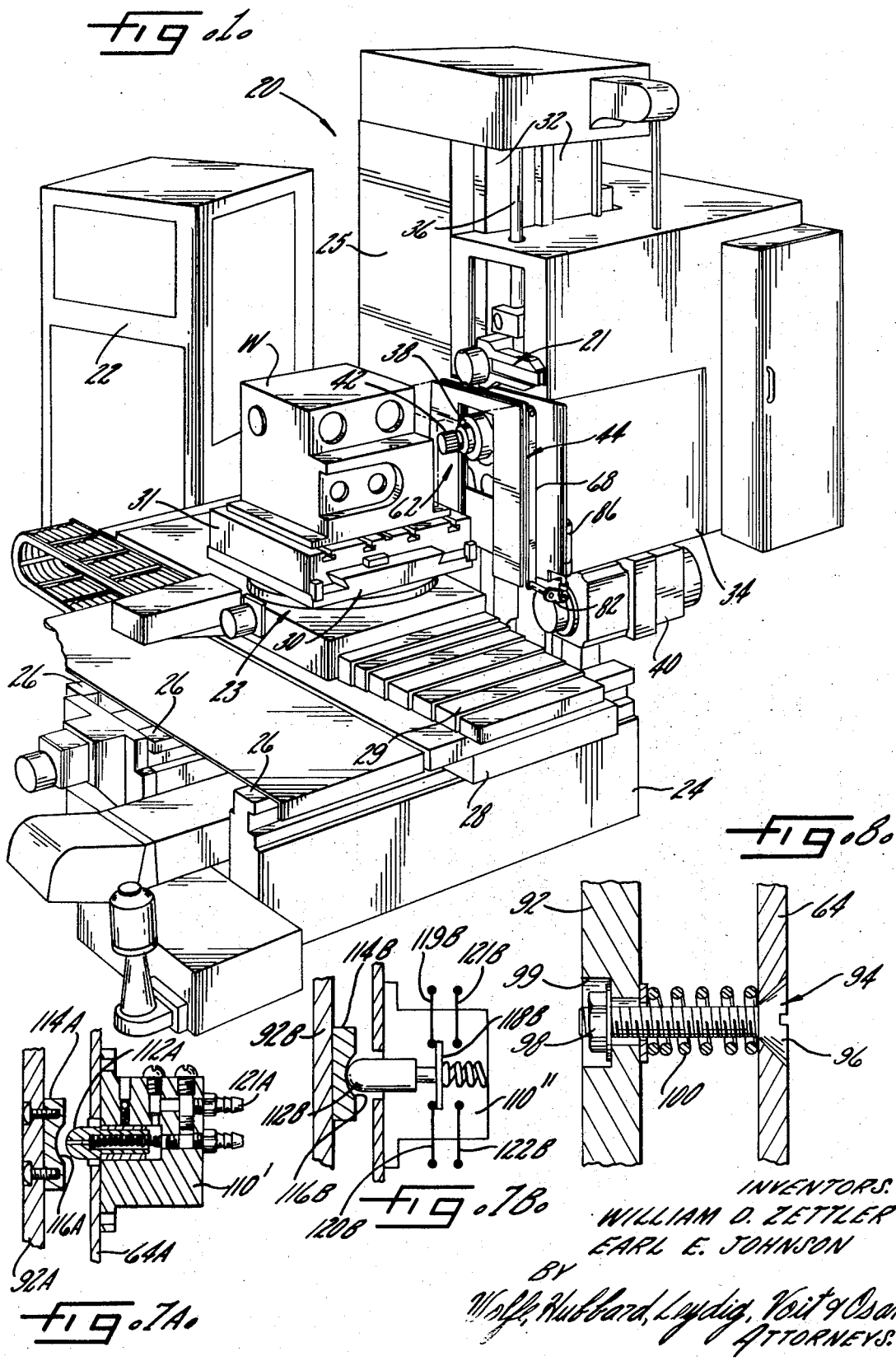

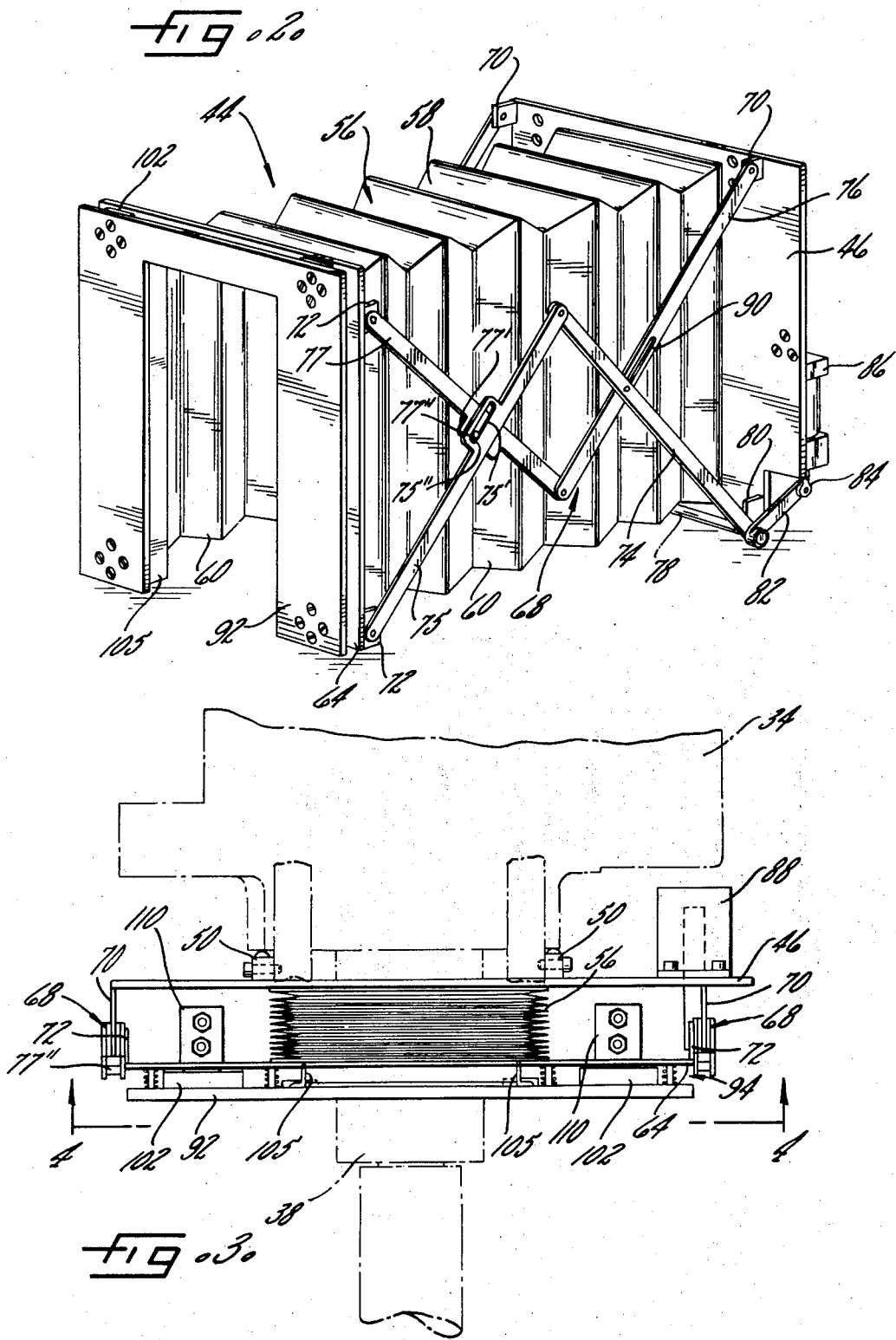

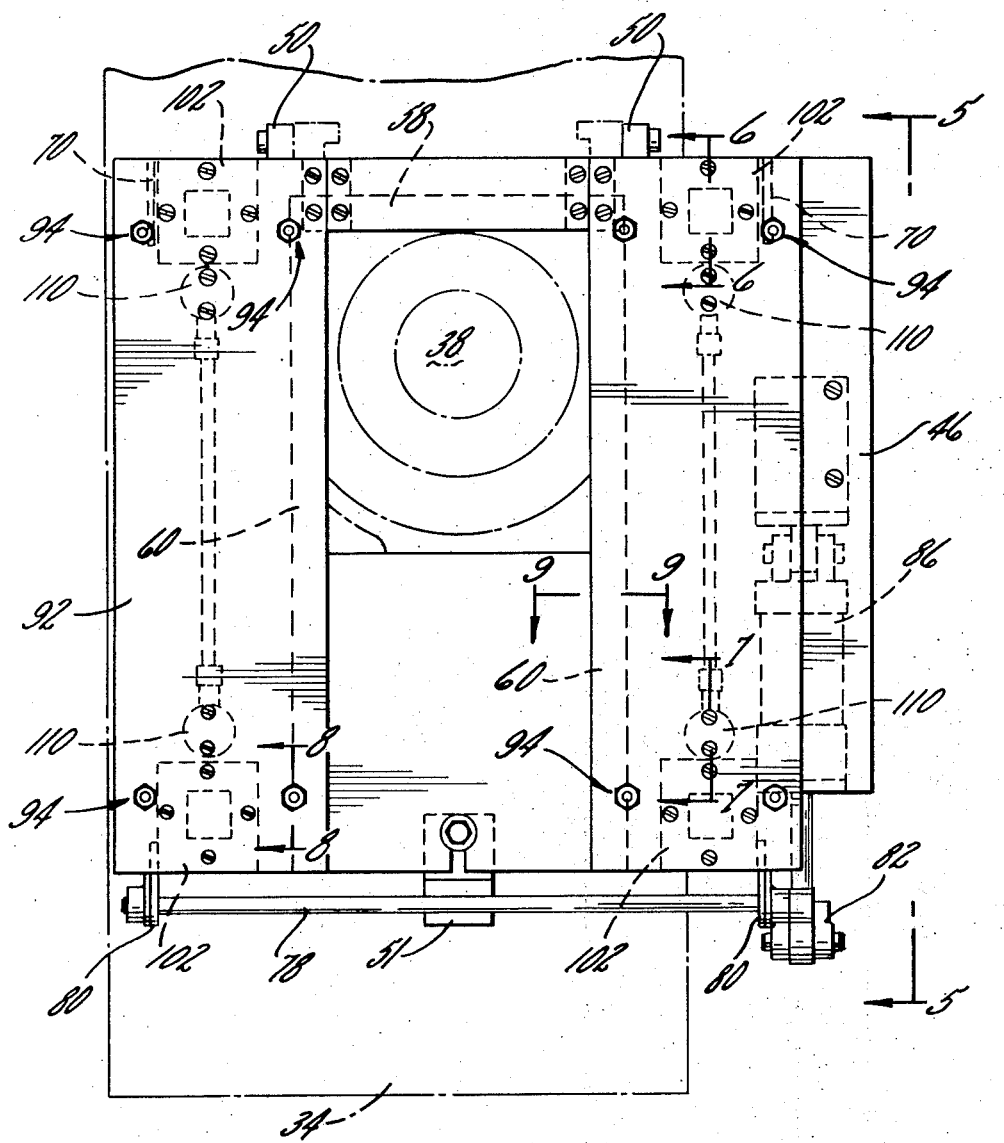

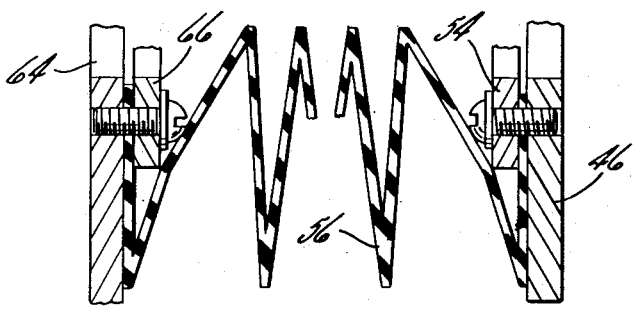
Fig. 9.
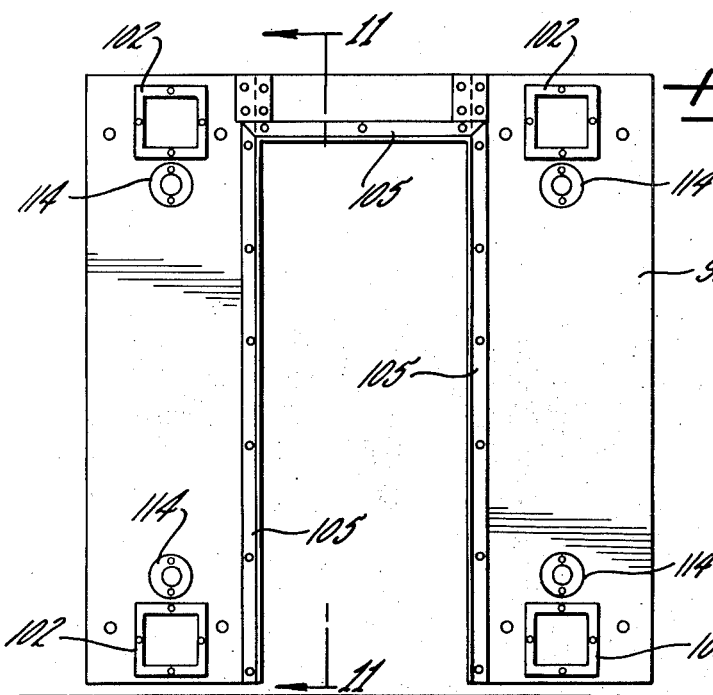
Fig. 10.
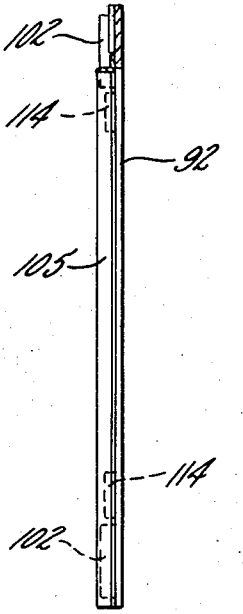
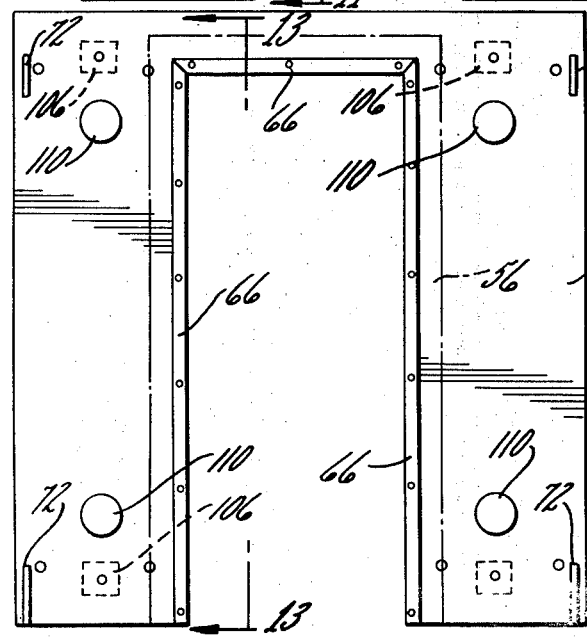
Fig. 12.
Fig. 11.
Fig. 13.
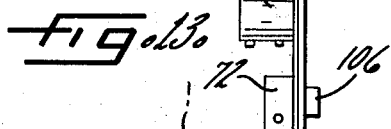
INVENTORS.
WILLIAM O. ZETTLER
EARL E. JOHNSON

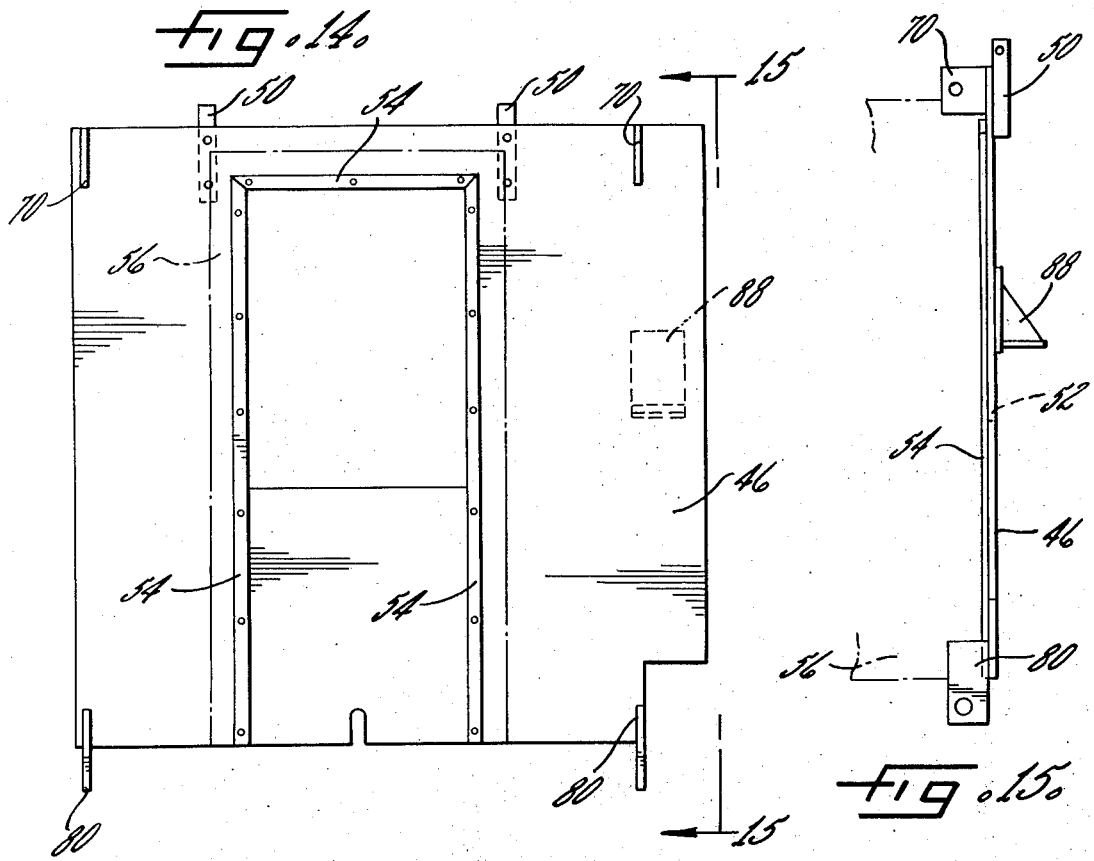
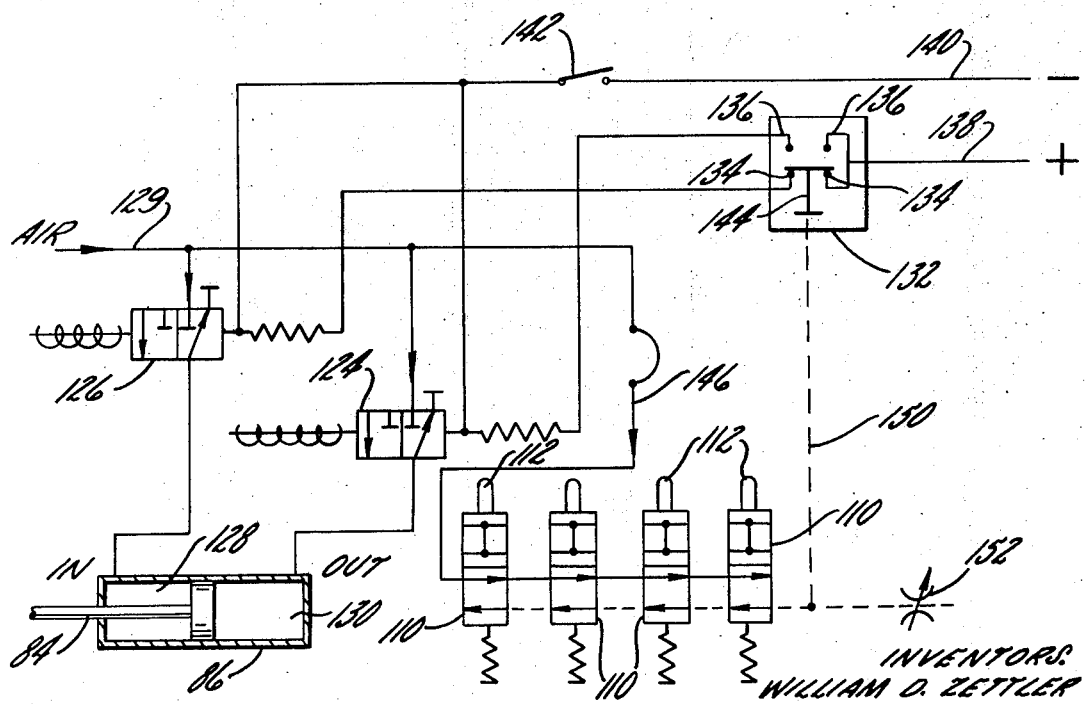

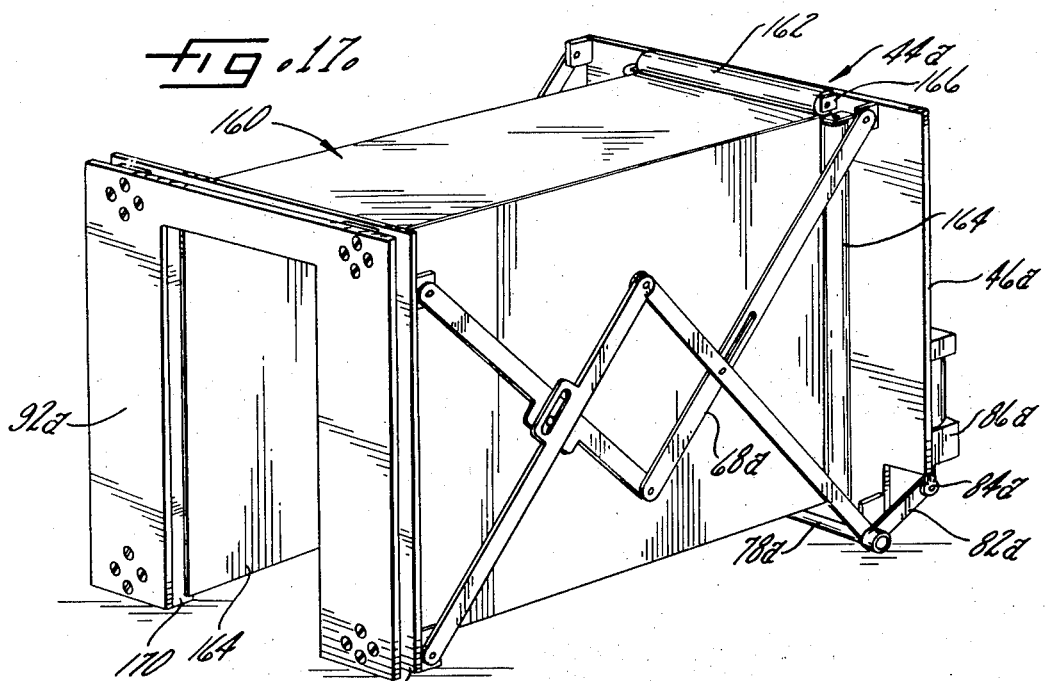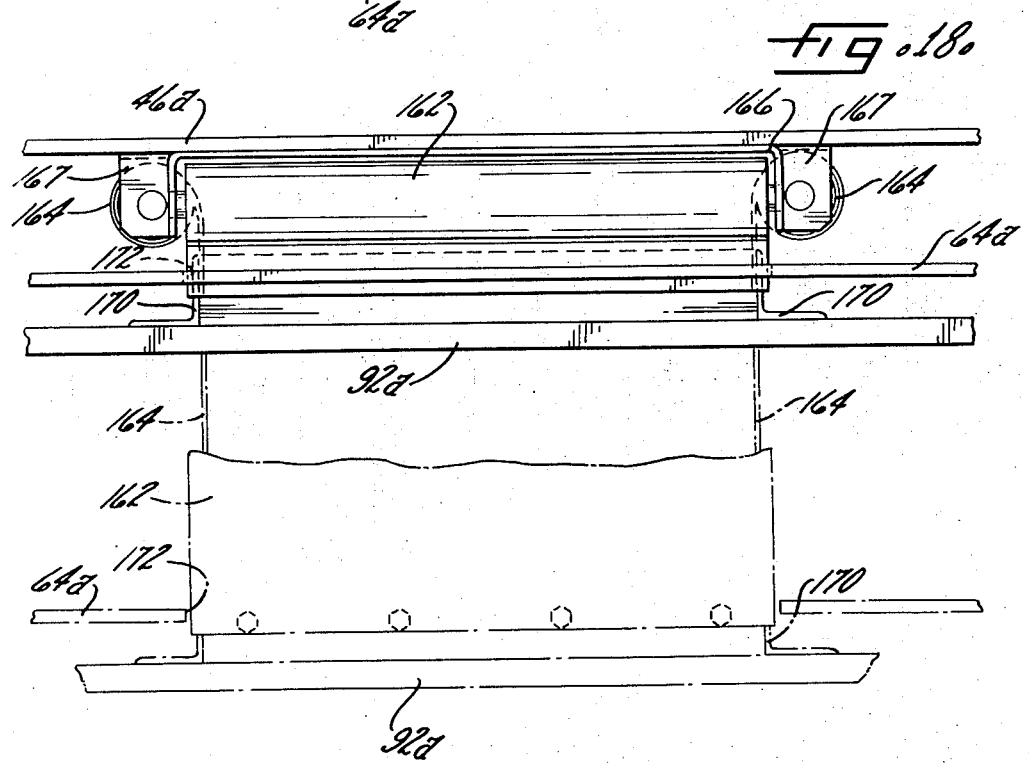

CHIP GUARD FOR MACHINE TOOLS

CROSS REFERENCE TO RELATED APPLICATION

The present application is a continuation-in-part of William D. Zettler et al application Ser. No. 108,917, filed Jan. 22, 1971, for Chip Guard for Machine Tools, which is now abandoned.

BACKGROUND OF THE INVENTION

The present invention relates generally to machine tool chip guards and more particularly, to an improved chip guard for milling machine tools and the like that shields, collects and directs away for disposal chips removed from a workpiece by machining operations, yet wherein the chip guard is automatically controlled to adjust for relative changes in the position of the workpiece. In its principal aspect, the present invention is concerned with an improved automatically operated chip guard which is particularly suitable for use in connection with automatically controlled machine tools.

In machine tool operations where metal is being removed from a workpiece by milling, drilling, boring and the like, there are considerable problems associated with the chips formed which can clog machine parts or interfere with machining operations as well as being hazardous to the safety of personnel in the area. With the now wide-spread use of automatically controlled machine tools such as those operating under numerical control, which may or may not be equipped with automatic tool changing devices, there is a considerable increase in the chip forming capacity of these machines as compared to the predecessor manually controlled machines. Thus, the collection and disposal of chips present a very acute problem in the industry. Moreover, with the increased usage of lighter, non-ferrous metals the problem of chip formations is intensified since a greater number of chips are formed by large standard multiple purpose machines operating at high speeds on such materials. Heretofore, there has not been any truly successful means for eliminating unwanted build-ups of chips or shielding the area from flying chips for use with automatically controlled machine tools.

Accordingly, it is an object of the present invention to provide a chip guard for multiple purpose machine tools in which positioning of the guard is automatically controlled to adjust for relative changes in the distance between the workpiece and the machine tool. While not so limited in its application, the invention will find especially advantageous use where the machine tool is to be operated by automatic control such as the various types of multi-function numerically controlled machine tools.

It is an object of the invention in one of its important aspects to provide a power operated chip guard which may be adapted for use with a wide variety of machine tool headstocks yet which is capable of adjusting automatically to enclose the space between the headstock and the workpiece to direct chips removed from the workpiece toward a disposal area below the tool operating station.

It is another object of the invention to provide a power operated chip guard in which the power actuation of the guard is controlled by sensing means carried by the forward end of the chip guard. In this connection, it is an object to provide an extensible guard which automatically repositions itself to adjust for irregularities and changes in spacing of the workpiece by virtue of lateral movements of the workpiece as well as axial movements that position portions of the workpiece closer to the headstock.

Yet another object of the invention is to provide a control for adjusting the position of the chip guard that is capable of retracting the guard at a rapid rate upon encountering an interference and after clearing the interference to return the guard to a working position in respect to the workpiece.

A further object is to provide a relatively simple, reliable chip guard arrangement which is particularly susceptible of installation on a machine such as a horizontal spindle multi-purpose machine tool. Other objects and advantages will become apparent as following description proceeds, taken together with the accompanying drawings.

DESCRIPTION OF THE DRAWINGS

FIG. 1 is a perspective view of an illustrative horizontal boring, drilling and milling machine embodying a chip guard assembly exemplifying the present invention;

FIG. 2 is an enlarged perspective view of the chip guard assembly shown in FIG. 1 here illustrated in an extended position;

FIG. 3 is a top elevational view of the chip guard assembly in the collapsed position showing its mounting with respect to principal parts of the headstock of the machine in FIG. 1 shown in phantom outline;

FIG. 4 is an enlarged vertical view of the front plate of the chip guard assembly taken in the plane of the line 4—4 of FIG. 2;

FIGS. 7A and 7B are views similar to FIG. 7 but here illustrating exemplary alternative sensing means;

FIG. 8 is an enlarged fragmentary section view taken substantially along the line 8—8 in FIG. 4;

FIG. 9 is an enlarged fragmentary section view taken substantially along the line 9—9 in FIG. 4;

FIG. 10 is a rear elevational view of the front plate taken in the plane of the line 10—10 in FIG. 5;

FIG. 11 is a sectional view taken in the plane of the line 11—11 in FIG. 10;

FIG. 12 is a rear elevational view of the rear of the intermediate plate taken in the plane of the line 12—12 in FIG. 5;

FIG. 13 is a sectional view taken in the plane of the line 13—13 in FIG. 12;

FIG. 14 is an elevational view of the front side of the back plate taken in the plane of the line 14—14 in FIG. 5;

FIG. 15 is a side elevation view taken along the line 15—15 in FIG. 14;

FIG. 16 is a schematic diagram of the control arrangement for the chip guard of the present invention;

FIG. 17 is a perspective view of the chip guard similar to FIG. 2, but here depicting a slightly modified version of the enclosure for the guard; and FIG. 18 is a top plan view of the chip guard of FIG. 17 in a retracted position and showing a partially extended position in phantom.

Figure 5:
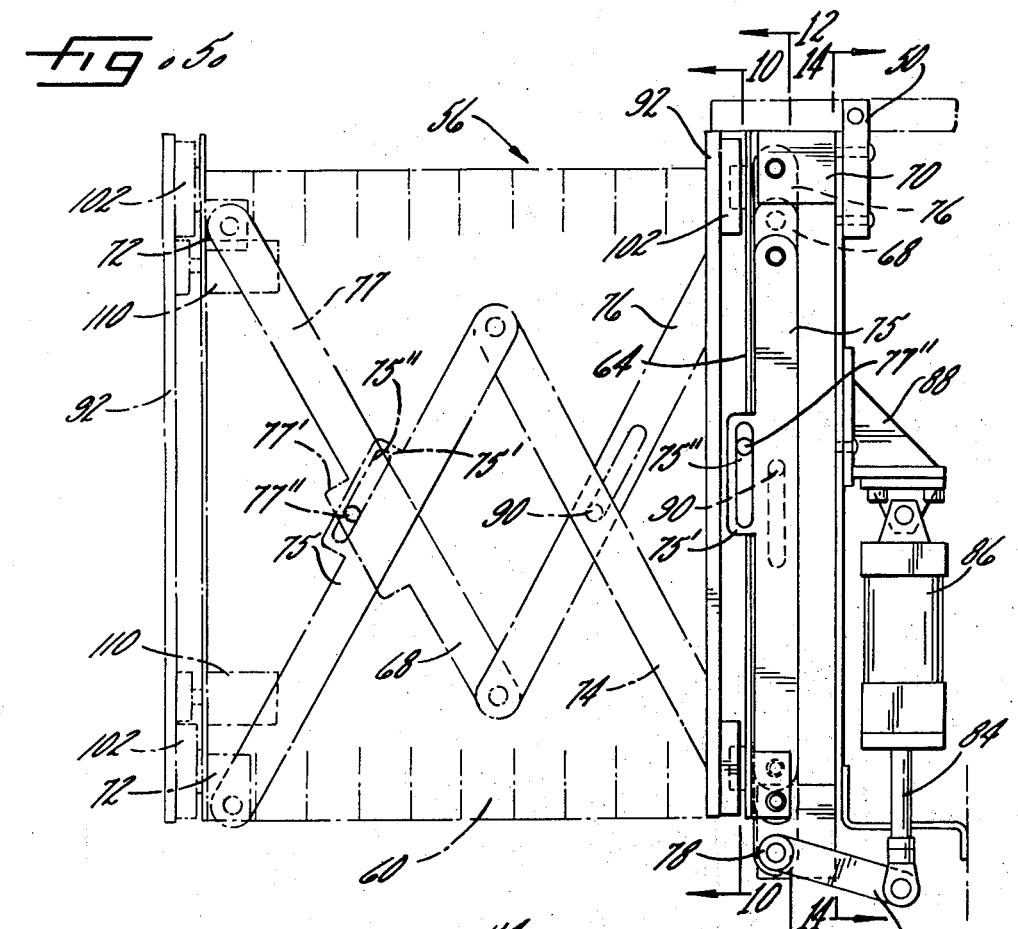
FIG. 5 is a side view of the chip guard assembly taken in the plane of the line 5—5 in FIG. 4 but with the chip guard in a partially extended position.

While the invention is susceptible of various modifications and alternative constructions, illustrative embodiments have been shown in the drawings and will be described below in considerable detail. It should be understood, however, that there is no intention to limit the invention to the specific forms disclosed but, on the contrary, the intention is to cover all modifications, alternative constructions, and equivalents falling within the spirit and scope of the invention.

GENERAL MACHINE ORGANIZATION

Referring more specifically to FIG. 1, the invention is there exemplified as incorporated in an illustrative horizontal boring, drilling and milling machine 20. The latter may, for example, be a machine of the foregoing type including an automatic tool changer 21 and for a more detailed description thereof, reference is made to U.S. Pat. No. 3,300,856 issued Jan. 31, 1967 on the application of Jesse Daugherty.

The illustrative machine tool 20 may be operated by automatic control means or by manual means. The automatic operation may be effected by a numerical control system 22 from the source of command signals derived for example, from a magnetic or punched tape through a control system connected to operate the various power driven components of the machine. Where the machine 20 is equipped with a tool changer 21 and power operated table 23 holding the workpiece it is capable of performing a series of machining operations from start to finish.

As viewed in FIG. 1, the machine tool 20 includes a bed 24 and an upstanding column 25 rigidly mounted thereto. The bed is formed with a plurality of ways 26 which slidably support a saddle 28. The latter is also formed with ways, which may be enclosed by covers 29, running transversely of the bed ways and slidably support the work table 22. In the present instance, the work table 22 includes a rotary indexing table 30 which carries a removable pallet 31 with a workpiece W rigidly clamped thereon. The column 29 has a pair of laterally spaced vertical ways 32 fixed to its right hand side. The headstock 34 is slidably mounted on the column ways 32 and vertically positionable in any desired point thereon by means of power driven lead screw 36.

Rotatably and translateably supported in the headstock is an extensible power driven spindle 38 also known as a "live spindle." The power is supplied to the headstock by a main drive motor 40 mounted in depending relation below it. Spindle 38 is adapted to receive and drive a tool 42 such as the one illustrated in FIG. 1.

CHIP GUARD ASSEMBLY

In accordance with the present invention there is provided an extensible chip guard assembly generally indicated at 44 mounted upon the headstock 34 and which automatically extends to position itself against the workpiece W when the tool in the spindle is operating thereon. In the present instance as best illustrated in FIG. 2, the chip guard 44 includes a base plate 46 of generally rectangular shape adapted to be secured to the front face of the headstock 34 and in surrounding relationship to the spindle 38 (FIGS. 1 and 3). For the purpose of securing the base plate to the headstock 34, there is provided a pair of brackets 50 (FIGS. 3 and 4) which support the upper end of the base plate and an angle bracket 51 (FIG. 4) secured to the lower end of the base plate is attached to the face of the headstock. A rectangular shaped cut-out 52 in base plate 46 (FIG. 14) provides an opening for the machine tool spindle sleeve 38 to pass through the chip guard.

Secured to the base plate 46 by means of a plurality of clamp strips 54 (FIGS. 9 and 14) is a bellows type guard or deflector 56 (FIGS. 2, 3 and 9) which surrounds the spindle on three sides. Referring to FIG. 2, the bellows 56 in the present instance is made up of pleated top wall 58 and vertical side walls 60 which permit expansion to cover the spindle at the tool operating station 62 (FIG. 1) during the machining operation and direct chips downwardly to a chip collector (not shown) located beneath the spindle and tool operating station.

The forward ends of the bellows walls are attached to an intermediate plate 64 (FIGS. 2, 5, 9, 12 and 13) by means of clamp strips 66 (only one of which is shown in FIG. 9). For the purpose of supporting the intermediate plate 64 and moving it parallel to and directly in front of the base plate 46 for horizontal adjustment back and forth with respect to the headstock, there is provided a pair of scissors support mechanisms 68 (FIGS. 2, 3 and 5). The scissors supports 68 are disposed adjacent the opposite side walls of the bellows and are connected to the base plate and intermediate plate respectively by bearing blocks 70, 72.

Referring to FIGS. 2 and 5, conjointly, it will be seen that each of the extensible scissors support mechanisms 68 is made up of two pairs of levers 74, 75 and 76, 77. Lever 74 is pivotally pinned adjacent one end to an end of lever 75 and the opposite end of lever 75 is pivotally pinned to a lower bearing block 72 of intermediate plate 74. Lever 76 is pivotally pinned adjacent one end to an upper bearing block 70 of back plate 46 and the opposite end of lever 76 is pinned to the adjacent end of lever 77. The opposite end of lever 77 is pinned to an upper bearing block 72 of intermediate plate 64. A similar scissors arrangement 68 is located on the other side of the chip guard.

Intermediate the ends of link 75 is an offset portion 75' having a slot 75'' therein. An offset portion 77' on link 77 carries a pin 77'' which rides in slot 75'' of link 75. This offset pin and slot arrangement not only provides rigidity to the links 75, 77 to hold the intermediate plate 64 in the vertical position, but it permits the linkage to collapse as viewed in FIG. 3 with all of the links aligned with one another.

In order to actuate the scissors mechanisms for extending and retracting the bellows and intermediate plate 64, the end of lever 74 adjacent the back plate 46 is fixedly secured to a transverse shaft 78 carried by bearing blocks 80 which are secured to the back plate 46. An end of the shaft 78 in turn is secured to one end of a link 82, the other end of which is pivotally secured to a reciprocating drive rod 84 of fluid operated cylinder 86 (FIGS. 2 and 5). The fluid cylinder 86 is mounted via an angle bracket 88 to the rear side of the back plate 46.

The arrangement is such that the operation of the fluid cylinder 86 reciprocating the drive rod 84 thereof, pivots link 82 which in turn rotates the shaft 78 that pivots link 74 about the shaft. The pivoting movement of link 74 causes link 75 to pivot too for extending and retracting the scissors linkage arrangements. In order to drive links 76 and 77 correspondingly, there is provided a pin and slot connection 90 intermediate the ends of links 74, 76 so that movement of the link 74 which carries the pin causes movement of the link 76 as the pin shifts within the slot therein.

In accordance with another of the important aspects of the present invention there is provided a face plate 92 resiliently mounted to permit compressing of the face plate toward the intermediate plate when the chip guard is extended longitudinally into contact with the workpiece. To provide a further safeguard against marring or damaging the workpiece, the face plate is preferably made of plastic or other synthetic resilient material. In carrying out this aspect of the invention, as best shown in FIGS. 2, 10 and 11, the face plate 92 is generally an inverted U-shaped member supported in a parallel relationship to the intermediate plate 64 with a plurality of pin assemblies 94 (FIG. 8), therebeing in the present instance eight in number. Each pin assembly 94 is made up of a bolt 96, the head of which is carried within a counterbored opening in the intermediate plate 64. The threaded bolt shank projects through an opening in the face plate 92 and receives a nut 98 threaded thereon and located within a counterbored opening 99 on the front side of the face plate. A compression spring 100 disposed about the shank of the bolt 96 and located between the intermediate plate 64 and the face plate 92 holds the plates in their normally spaced apart relationship.

Figure 6:
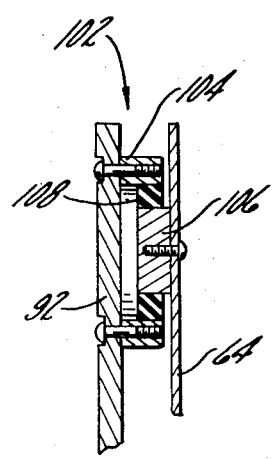
FIG. 6 is an enlarged fragmentary section view taken substantially along the line 6—6 in FIG. 4.

In addition to the pin assemblies 94, there is provided further resilient mounting members 102 (FIGS. 3, 4 and 6), therebeing four in number, located adjacent the outer four corners of the face and intermediate plates. As best illustrated in FIG. 6, each resilient support member 102 includes a generally rectangular frame 104 secured to the rearward side of the face plate 92. The frame surrounds a rectangular block 106 secured to the forward side of the intermediate plate and fits within the central opening of the frame 104. In order to provide a resilient connection between the block 106 and the frame 104 a cushion 108 is provided which may be of sponge rubber or other suitable similar material adhesively bonded to the block 106 and the frame 104.

To close the gap about the opening of the face plate and intermediate plate there is provided angle brackets 105 (FIGS. 3, 10, 11) mounted on the rearward side of the face plate.

CHIP GUARD CONTROL SYSTEM

Figure 7:
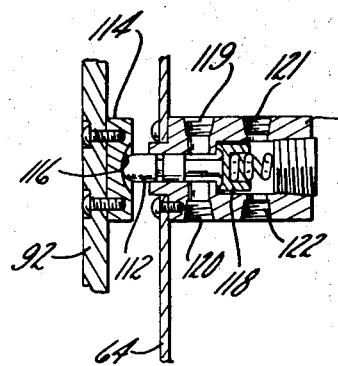
FIG. 7 is an enlarged fragmentary section view taken substantially along the line 7—7 in FIG. 4.

In carrying out the present invention, the chip guard is provided with a sensing arrangement controlling the operation of fluid cylinder 86 to automatically extend and retract the chip guard incident to relative changes in position between the workpiece and the machine tool headstock. To this end, a plurality of control valves 110 (FIGS. 3 and 7) are mounted on the intermediate plate 64 with each of the valve operating stems 112 projecting forwardly toward the rear side of the face plate 92 and the stems being normally biased toward contoured blocks 114 mounted on the rear side of the face plate 92. The arrangement is such that the ends of stems 112 and the respective contoured portions 116 of blocks 114 are in close proximity when the face plate 92 is extended away from the intermediate plate 64 in the normal undeflected state. Thus, when the chip guard is extended and the face plate engages a fixed object such as the workpiece, the face plate is urged toward the intermediate plate against the action of the pin assembly springs and the contoured blocks 114 bear against the valve stems 112 thereby urging the valves 118 away from their seats. Pressure fluid flow normally through inlet and outlet ports 119, 120 of one or more of valves 110 is then directed to ports 121, 122. Similarly, application of a force to any of the side edges of the face plate 92 due to the contoured surface of the blocks 116 will cam one or more of the valve stems 112 inwardly to open their respective valves.

It will be appreciated by those skilled in the art that alternative sensing means beside the mechanically operated fluid control valves 110 may be utilized in accordance with the present invention. Thus, referring to FIG. 7A there is shown an air operated proximity sensor 110A (only one being shown) which is secured to the intermediate plate 64A. The proximity sensor 110A operates in conjunction with the contoured block 114A carried by the face plate 92A such that narrowing of a predetermined gap between the jet orifice of the sensor and the block causes restriction of a continuous air stream coming from the jet orifice 112A of the sensor 110A and the sensor valve is triggered to direct art flow through an output conduit 121A to the control circuit. It will likewise be appreciated that with such air operated or other known proximity position sensing devices, a plurality of them may be mounted on the plate 64 which can itself form the face plate of the chip guard and then plate 92 can be omitted. With such an arrangement, the sensing devices directly transmit required control signals to cylinder 86 to extend, stop and retract the chip guard.

Referring to FIG. 7B, still another form of sensing means is shown, the sensing device 110B being in this case a double contact electrical switch 118B. With such an arrangement the circuit to contacts 119B, 120B is normally closed so that electrical signals would be transmitted directly to control the fluid operated cylinder 86 to advance the chip guard. Depression of the plunger 112B opens the 119B, 120B contacts to stop the advancement of the chip guard. When sufficient force is applied by block 116B to depress plunger 112B so that the circuit through contacts 121B, 122B is closed, the cylinder 86 is activated to retract the chip guard.

Turning now to FIG. 16, there is shown an exemplary schematic diagram of the control circuit utilized for automatically operating the chip guard assembly in accordance with the present invention. To this end, as shown in FIG. 16 there is provided a pair of solenoid operated valves 124, 126 which alternately control the application of fluid pressure to opposite sides of fluid operated cylinder 86. With valve 126 open to a source of fluid pressure 129 such as air, pressure is applied to chamber 128 of cylinder 86 and the piston coupled to power shaft 84 moves to the right as viewed in FIG. 16 which retracts the chip guard. On the other hand when valve 124 connects the source 129 to chamber 130, the piston with power shaft 84 moves to the left as viewed in FIG. 16 and the chip guard is extended toward the workpiece. The valves 124, 126 are arranged so that when one is connected to the source 129 the other is vented to release pressure from the side of the cylinder opposite the side to which pressure is being applied.

In order to energize and de-energize the valves 124, 126 alternately, a pressure switch 132 is provided with contacts 134, 136 to respectively connect bus line 138 to solenoid valves 126, 124. The common bus line 140 is connected through a switch 142 to both solenoid valves. It will be appreciated by those skilled in the art that the switch 142 may be manually operated or may be operated by the numerical control system 22 of the machine tool.

In keeping with the invention, movement of the chip guard via alternate application of pressure to cylinder 86 is controlled by the sensing valves 110 which in turn operate a pressure contact 144 of pressure switch 132. Thus, when the face plate and intermediate plate carrying the valves 110 are at their normally parallel spaced relation and plungers 112 of the valves are in their normally outward position, the valves are closed and interconnected in series with the fluid pressure source through conduit 146. Pressure contact 144 of pressure switch 142 normally closes contacts 134 maintaining solenoid valve 126 energized with the main switch 142 closed. This causes the pressure to be directed into chamber 128 of cylinder 86 driving the scissors mechanisms and face plate rapidly outwardly to the workpiece. When the face plate contacts the workpiece due to the reaction force on impact, the face plate 92 will compress toward the intermediate plate 64 which will depress one or more of the plungers 112 of valves 110. Fluid pressure will then be applied through line 150 which also connects the valves in series to pressure contact 144 moving it upwardly as viewed in FIG. 16 to close contacts 136 and open contacts 134. Consequently, solenoid valve 126 is de-energized and solenoid valve 124 is energized so that fluid pressure is now applied to chamber 130 of fluid cylinder 86 which causes the face plate and intermediate plate of the chip guard to retreat.

The retreat of the plates 92, 46 and collapse of cover 56 of the chip guard occurs over very short distance until the action of the normally outwardly biased face plate restores the gap between the intermediate plate and face plate so that all of the valves 110 again close. A bleeder valve 152 in fluid line 150 releases the pressure in the line 150 and pressure contact 144 returns to close contacts 134 and open contacts 136. Solenoid valve 124 then is de-energized while solenoid valve 126 is energized so that fluid pressure is again restored to chamber 128 extending the face plate of the chip guard back into contact with the workpieces. This secondary movement of the guard as distinguished from the rapid primary movement is with much less force because of the smaller distance of travel of the face plate. Because of the normal outward biasing of the face plate from the intermediate plate and the pressure within the valve control system there is a greater total force urging the face plate away from the intermediate plate then can be overcome by impact with the workpiece causing the chip guard face plate to come to rest against the workpiece.

Should the distance between the workpiece and the base of the tool operator at the headstock change in any one of the several axis of motions possible with the rotary work table 23, it will readily be seen that the chip guard will automatically readjust itself to accomodate for such change in relative position. After the chip guard face has come to rest on the workpiece for a first cutting operation and the workpiece is then moved further away from the headstock for a next cutting operation, since the fluid pressure in cylinder 86 is directed so that it tends to drive the chip guard outwardly, the face plate will follow and move to a further extended position so long as it has not been completely extended. If on the other hand the workpiece is moved toward the headstock, a sufficient force will be applied to the face plate to overcome the predetermined force necessary to move the face plate toward the intermediate plate and to activate one or more of the valves 110. The chip guard will then retract until all the depressed valve plungers 112 release whereupon the face plate will again be extended forward until it comes to rest against the workpiece. Similarly, transverse movement or rotary movement of the workpiece which causes any portion thereof to bear against the face plate so as apply a component fo force in the direction toward the machine tool will overcome its outwardly biasing force with respect to the intermediate plate and will actuate one or more of the valves 110 causing the chip guard to retract.

Turning now to FIG. 17, there is shown a slightly modified form of chip guard generally indicated at 44A. In this instance, the chip guard 44A includes the back plate 46A, intermediate plate 64A, scissors mechanisms 68A with its drive 86A and face plate 92A, all similar to that shown in respect to the embodiment of FIG. 2. Here, however, in place of the pleated collapsible closure 56 of FIG. 2, there is provided a cover arrangement 150 wherein the top and side walls of the cover are made up of sheet material carried by rollers 162, 164, respectively. The rollers mounted on brackets 166, 167 are torsionally activated by suitable springs or the like so as to normally wind the material on the rollers when the scissors mechanisms 68A an collapsed and the face plate and intermediate plate are in close proximity to the base plate 46A. Extension of the scissors mechanisms 68A (FIG. 18) to move the face plate and intermediate plate outwardly pulls the sheet material to unwind the rolls against the normal winding action of the roller springs (not shown). The leading edges of the sheet-like top and side walls of the cover are attached to angle brackets 170 mounted to the inward side of the face plate and disposed about the generally rectangular opening therein. The intermediate plate 64A has a slightly larger opening 172 (FIG. 18) and the angle brackets with the attached sheet wall ends enclose the gap between the intermediate plate and face plate about the peripheries of the rectangular openings in the plates.

We claim as our invention:

1. A chip guard for a machine tool having a tool operator adapted to carry a tool for performing machining operations on a workpiece at an operating station, comprising, in combination, a base member adapted to be secured to said machine tool about the base of the tool operator, movable face means disposed about the tool operator parallel to said base member, extensible support means coupling said face means to said base member, means for automatically powering said support means to extend and retract the face means longitudinally with respect to the base of said tool operator and the workpiece at the operating station and extensible cover means including a top and side walls interconnecting said base member and said face means.

2. A chip guard in accordance with claim 1 including sensing means carried by said face for activating and deactivating said power means driving the support means so that said face means adjusts to relative changes in distance between the workpiece and the base of the tool operator.

3. A chip guard as claimed in claim 2 wherein said automatic power means is normally actuated to drive the support means and face means outwardly toward the workpiece and said sensing means deactivates the power means upon application of a predetermined component of force to said face means in a direction toward the machine tool.

4. A chip guard as claimed in claim 1 wherein said face means includes an intermediate member and a face member resiliently coupled to said intermediate member.

5. A chip guard as claimed in claim 4 wherein said face member is made of a resilient material.

6. A chip guard as claimed in claim 1 wherein said cover means comprises a bellows structure made up of pleated material.

7. A chip guard as claimed in claim 1 wherein said cover means comprises sheet material carried by rollers, said rollers being torsionally activated to normally wind the material on the rollers when said face means moves toward the base member.

8. A chip guard as claimed in claim 1 wherein said extensible support means comprises a pair of scissors linkages disposed adjacent the side walls of said cover means.

9. A chip guard as claimed in claim 1 wherein said power means includes a fluid operated mechanism which is normally actuated in a first direction to extend said support means toward the workpiece and means responsive to the application of a component of force in excess of a predetermined amount and in a direction opposite to said first direction to actuate said fluid operated mechanism driving the support means and face means away from the workpiece until said excess amount of force is eliminated.

10. A chip guard for deflecting chips away from an operating station of a machine tool having a tool operator adapted to carry a tool for performing machining operations on a workpiece, comprising, in combination, a base member adapted to be secured to said machine tool about the base of the tool operator, an intermediate member parallel to said base member surrounding at least the top and sides of the tool operator, extensible support means coupling said intermediate member to said base member, a face member resiliently mounted to said intermediate member and biased away from the latter in a normally parallel position, extensible cover means including a top and side walls between said base member and said intermediate member, and means for automatically powering said support means to extend the face member against the workpiece at the operating station.

11. A chip guard as claimed in claim 10 including sensing means associated with said intermediate and face members for controlling said power means, said sensing means being actuated by contact between the face means and workpiece so that application of a component of force applied to said face member overcoming the biasing force thereon urges said face member toward said intermediate member operating said sensing means and actuating the power means for retracting said chip guard.

12. A chip guard as claimed in claim 10 wherein said sensing means comprises a plurality of fluid operated valves carried by said intermediate member, said valves having operating means projecting within the space between said face member and said intermediate member and a plurality of contoured surfaces on said face member disposed adjacent said fluid valve operating means, said contoured surfaces being dimensioned so that transverse movement as well as longitudinal movement of said face member toward said intermediate member actuates said valve operating means.

13. A chip guard for a machine tool having a tool operator adapted to carry a tool for performing machining operations on a workpiece at an operating station, comprising, in combination, a base member adapted to be secured to said machine tool about the base of the tool operator, movable face means disposed about the tool operator parallel to said base member, extensible support means coupling said face means to said base member, means for powering said support means to extend and retract the face means longitudinally with respect to the base of said tool operator and the workpiece at the operating station, extensible cover means interconnecting said base member and said face means, and sensing means for activating and deactivating said power means driving the support means so that said face means automatically adjusts to relative changes in distance between the workpiece and the base of the tool operator.

14. A chip guard as claimed in claim 13 wherein said power means is normally actuated to drive the support means and face means outwardly toward the workpiece and said sensing means deactivates the power means upon application of a predetermined component of force to said face means in a direction toward the machine tool.

15. A chip guard as claimed in claim 13 wherein said sensing means is carried by said face means and comprises proximity detection devices for controlling said power means.

* * * * *

PO-1050
(5/69)

UNITED STATES PATENT OFFICE
CERTIFICATE OF CORRECTION

Patent No. 3,824,890          Dated July 23, 1974

Inventor(s) William D. Zettler and Earl E. Johnson

It is certified that error appears in the above-identified patent and that said Letters Patent are hereby corrected as shown below:

Column 6, Line 30, "art" should be --air--.

Column 9, Line 4 (Claim 2), after "face" insert --means--.

Signed and sealed this 19th day of November 1974.

(SEAL)
Attest:

McCOY M. GIBSON JR.
Attesting Officer

C. MARSHALL DANN
Commissioner of Patents